United States Patent [19]

Fabris

[11] Patent Number: 5,556,114
[45] Date of Patent: Sep. 17, 1996

[54] HYDRAULIC EXPANDING AND CONTRACTING MANDREL

[76] Inventor: Mario Fabris, Grimsby, Canada

[21] Appl. No.: 492,797

[22] Filed: Jun. 20, 1995

[51] Int. Cl.$^6$ ............................. B23B 31/30; B23B 31/40
[52] U.S. Cl. ..................... 279/2.08; 82/169; 279/4.03
[58] Field of Search ........................... 279/2.08, 4.03; 82/169

[56] References Cited

U.S. PATENT DOCUMENTS

| | | | |
|---|---|---|---|
| 3,250,542 | 5/1966 | Winnen et al. | 279/2.08 |
| 3,830,509 | 8/1974 | Weber | 279/2.08 |
| 4,244,248 | 1/1981 | Adell et al. | 279/2.08 |
| 4,366,735 | 1/1983 | Dubois, Sr. | 279/2.08 |
| 4,502,703 | 3/1985 | Rohm | 279/2.08 |

FOREIGN PATENT DOCUMENTS

| | | | |
|---|---|---|---|
| 3407315 | 9/1985 | Germany | 279/2.08 |
| 2224678 | 5/1990 | United Kingdom | 279/2.08 |

*Primary Examiner*—Steven C. Bishop
*Attorney, Agent, or Firm*—Edward H. Oldham

[57] ABSTRACT

This invention relates to a workshop mandrel which is suitable for mounting work pieces on its cylindraceous outer surface. A cavity beneath the surface is filled with hydraulic fluid which causes the outer surface to expand when the fluid is pressurized to lock a work piece on the mandrel.

6 Claims, 1 Drawing Sheet

HYDRAULIC EXPANDING AND CONTRACTING MANDREL

FIELD OF THE INVENTION

This invention relates to a mandrel which is useful in clamping a work piece thereon for rotation about a central axis. Unlike an expandable collet type chuck which utilizes a conically tapered shaft to expand a segmented tube, this invention utilizes hollow cylindraceous mandrel filled with hydraulic fluid and having "thin" walls over which a work piece is slid until the work reaches the desired position on the mandrel. Upon reaching the desired position on the mandrel, the pressure on the hydraulic fluid in the central interior cavity of the hollow mandrel is increased sufficiently to "bulge" the cylindraceous thin wall so as to expand the circumference of the cylindraceous surface and securely lock the work on to the mandrel. When the required operation on the work is completed, the hydraulic pressure on the fluid in the interior of the mandrel is decreased until the walls of the cylindraceous mandrel return to the previous unexpanded dimension, whereupon the work may be slid off the mandrel.

BACKGROUND OF THE INVENTION

Rotating engine, lathes, and grinders, etc. have used various methods to lock the rotating work in or on chucks for rotation of the work. Chucks and collets have been used to capture and lock rotating work which must be shaped, ground and polished. In modern high productivity environments, the removal of finished work and the installation of a new work piece in engine, lathes, grinders, etc. or other rotating machinery may require substantial time, and it is to shorten the "down" time when the machine must undergo the removal and reloading of new work in the engine lathe that this invention is directed.

In the past, a mandrel was securely fastened to the rotating spindle of the engine lathe on which it is mounted and the mandrel must be expanded to fix the work on the mandrel. If the mandrel was of the type utilizing an expandable collet type chuck, the operator must fix the work to or on the chuck and then increase the diameter of the expanding collet to grip the work. This operation would normally be accomplished by the operator using a wrench to advance a screw mechanism that would pull and expanding conical surface into an expanding segmented tube of the expandable collet.

On the other hand, if the work is to be mounted on a chuck which is provided with jaws, which move in concert, the operator must insert a key into the chuck to release the work and a new work piece must be mounted on the chuck to permit work to be done on the newly installed work piece. The operator must use a key to expand the jaws of the chuck if the work is of the type having a central bore in which the expanding jaws may be inserted.

If the work is of sufficient size to require a crane to carry the work to the engine lathe, considerable time and effort is required for the operator to mount and dismount the work in the engine lathe, and to assure that it is correctly mounted and centered.

SUMMARY OF THE INVENTION

It is an object of this invention to provide an expanding mandrel of the type that utilizes high pressure hydraulic fluid to increase the circumference of the hub on which the work is to be mounted. The pressure of the fluid may be controlled by flow controlled hydraulic valves and gauges, but in the present application, an internal piston in the internal cavity of the mandrel is laterally movable to increase or decrease the pressure on the hydraulic fluid in the cavity by some external actuating means. This piston may be activated from a remote location, thus the operator is not required to physically operate a clamping or fixing device on the mandrel which is required to expand the mandrel or chuck to engage and fix the work piece on the mandrel.

The invention takes advantage of the physical characteristic of steel in that, the thin walls of the mandrel are deformed within the elastic limit of the steel comprising such walls. When the pressure on the fluid which has caused the deformation is removed, the elasticity of the steel returns the walls to their previously unstressed position. For this reason, the number of clamping cycles which may be performed by this mandrel are almost without limit.

Because this mandrel relies on a change of hydraulic fluid static pressure for actuation of the clamping mechanism instead of the complex mechanical mechanisms of the prior art, this device is simpler to manufacture than prior an devices, and additionally, there is little likelihood that the device will fail from the wearing of mechanical pans which may occur with prior an devices.

Because the hydraulic expanding mandrel is completely enclosed, there is no access for foreign particles or moisture into the interior of the device thus problems associated with the ingress of foreign particles and moisture which cause erratic operation, premature wear and sizing of mating pans associated with previous types of mechanically expanding mandrels are avoided.

Other advantages not immediately apparent from a casual examination of this invention are nevertheless present in the operation of this invention. Because the complete circumference of the cylindraceous surface expands when the hydraulic pressure inside the device is increased to its design pressure, the entire surface engages the entire interior bore of a workpiece mounted on the mandrel.

This feature is important when comparison is made with prior art devices. When comparison is made between the clamping action of the device of this invention and a standard three jaw lathe chuck, there are substantial differences.

A standard three jaw internally expanding chuck always imparts triangular distortion to the bore of any workpiece clamped in the jaws thereof because of the magnitude of the radial forces required to rigidly secure a workpiece in the chuck. The distortion will be more pronounced as the wall thickness of the workpiece decreases. As a result, it is difficult to obtain an undistorted workpiece from a three jaw chuck once the finished workpiece is removed from the chuck.

Similarly, the many jaws of an internally expanding mandrel make an arcing contact with the internal bore of a workpiece and any irregularities in the mandrel and the conical wedge which forces the segments outwardly may cause some segments of the mandrel to exert more pressure on the bore than other segments. The result is that the workpiece may not necessarily be accurately remounted on the internally expanding mandrel if for some reason it must be removed from the segmented mandrel during finishing.

Another feature of applicant's invention is repeatability, that is the ability of a chucking device to grip a workpiece and repeatedly be able to assure that the workpiece is in a concentric relationship with the axis of the rotating spindle on which the chucking device is mounted.

In examination of the operation of a three jaw chuck it may be found that the three jaws do not always move in exact synchronism especially if the key is inserted into a different receptacle on the chuck each time a workpiece is mounted in the chuck. The internal expanding device of this invention exhibits excellent repeatability because of the way the clamping surface of the device expands during a clamping operation. The lack of interlocking mechanical pans prevents the hysteresis and dead band problems associated with mechanical devices, so that the repeatability of applicant's device in accurately clamping and locking workpieces within its designed operating specifications is unsurpassed by prior art devices.

Because the hydraulic fluid pressure exerts the same pressure on the interior surface of applicant's device, the wall of the device is expanded to the same degree (maintaining concentricity) thus, the workpiece will be clamped and locked on the device so that its axis is concentric with the spindle axis of the machine on which it is mounted.

The above features may be used to avoid a situation generally referred to as "runout" which is ever present in the clamping and locking action of most prior an chucking devices. A skilled operator will indeed know how to mount workpieces in prior art chucking devices to minimize "runout" but precious shop time may be lost by the operator in dealing with the normal "runout" which occurs in clamping workpieces.

The clamping device of this invention is inherently rugged and as such tends to have a long shop life when used within its design capability. Because the entire surface of the device expands to contact the entire internal bore of a workpiece, the entire surface provides an excellent gripping facility and wear tends to be minimized.

When the device has been in operation for a time sufficient for the clamping surface of device to become worn, the cylindraceous outer surface of the device may be completely regenerated, for instance, by grinding the mandrel surface, chrome plating the ground surface, grinding and polishing the rechromed surface to its original diameter. The recoated device may begin a new life after the chrome plating operation is complete.

DESCRIPTION OF THE PREFERRED EMBODIMENT

Figure 1:
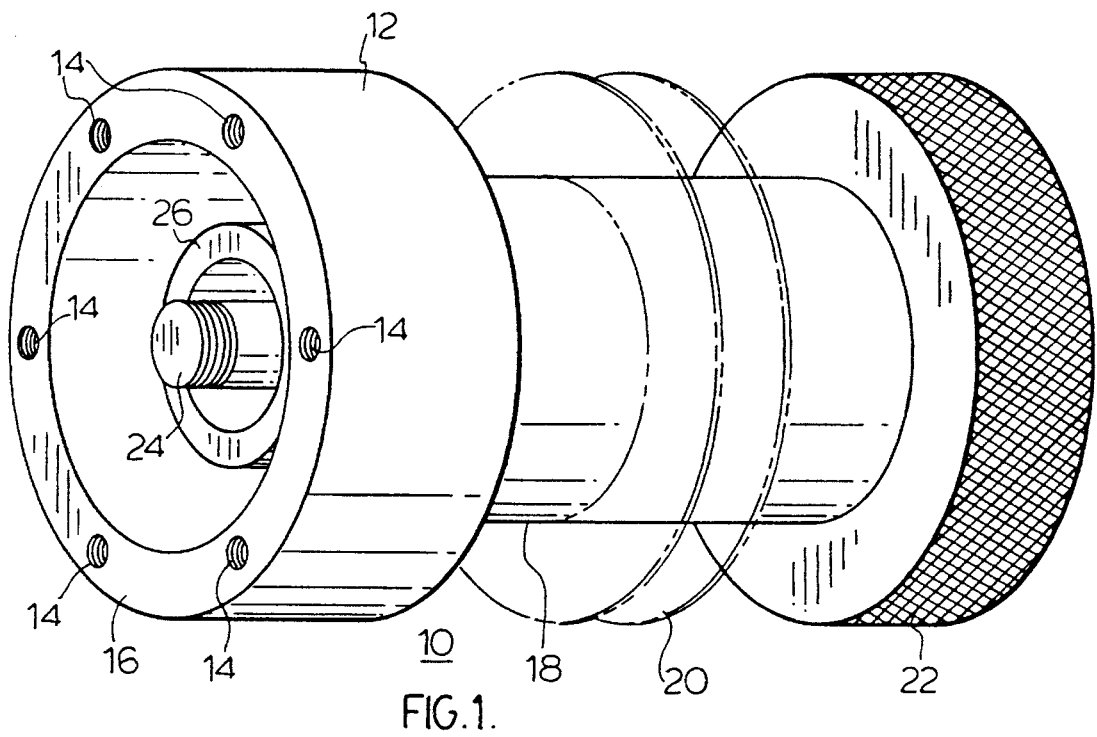
FIG. 1 is a perspective view of the device of this invention.

FIG. 1 shows the rotating mandrel 10 which is used to clamp work which must be rotated for a shop operation.

Mandrel 10 is shown having an adaptor with a series of tapped holes 14 in the annular surface 16 thereof. The mandrel may be affixed to lathe spindles, these provisions which are standard in the industry, and in this instance, the adaptor boss 12 is intended to be fitted to a standard camlock spindle nose. The method of attachment forms no part of this invention.

Integrally attached to adaptor 12 is a cylinder 18 on which work 20 is clamped. A locking ring 22 is shown threaded onto the end of cylinder 18.

The use of locking ring 22 is optional and its presence may not be required in all operations.

A threaded end 24 of a movable piston is shown protruding from boss 26.

Figure 2:
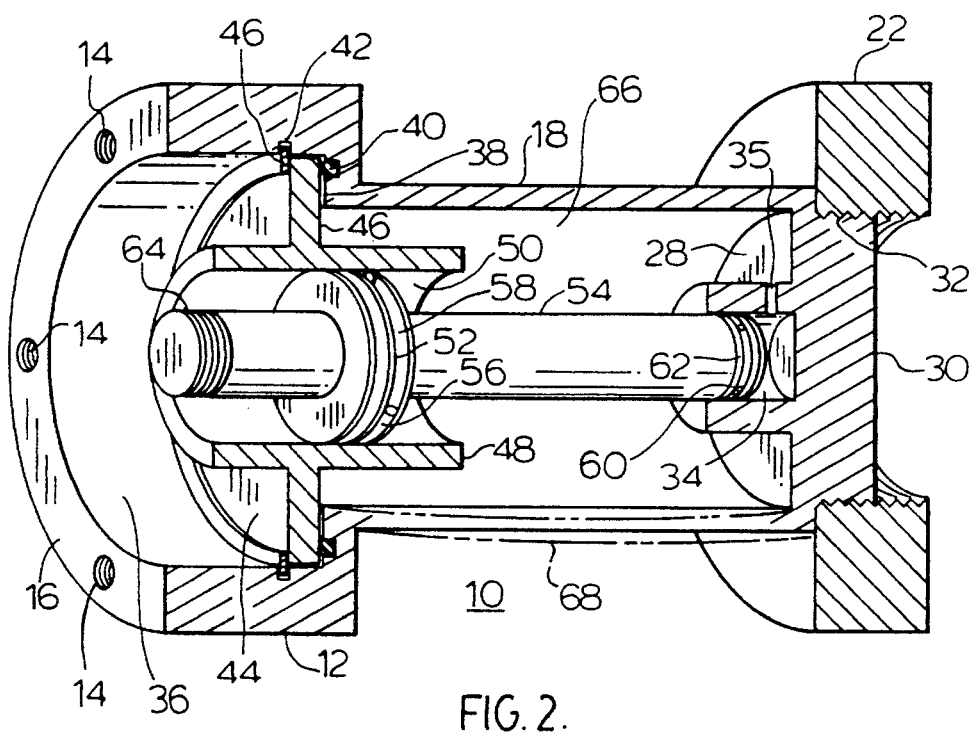
FIG. 2 is a partial perspective of the device of FIG. 1 showing the interior of the device of this invention.

Referring now to FIG. 2, a sectional perspective view of the device of FIG. 1 is shown for ease of understanding.

Adaptor boss 12 of mandrel 10 is partially shown with the tapped holes 14 in end surface 16. It may now be clearly seen that adaptor boss 12 and cylinder 18 are integrally connected. Cylinder 18 extends into end boss 28 which forms an end wall 30 to close cylinder 18 and provides a threaded end surface for the attachment of safety locking ring 22. End boss 28 has a cylindraceous bore 34 in the central portion thereof. Bore 34 is provided with a port 35 which connects the interior of bore 34 with chamber 66.

Adaptor boss 12 has a cylindrical bore in the interior thereof which terminates in shoulder 38. A groove 40 is provided in shoulder 38 to receive "O" ring 40. A groove 42 is provided in bore 36 of boss 12.

Boss 44 comprises annular ring 46 integrally connected to cylinder 48, which is provided with interior bore 50.

A piston 52 mounted on shaft 54 is provided to be mounted within bore 50 and bore 34. Piston 52 is supplied with "O" rings 56 in grooves 58 to provide the required seal between bore 50 and piston 52 and the shaft 54 is provided with grooves 60 for receipt of "O" rings 62 at the opposite end thereof in bore 34.

Shaft 54 is also extended beyond piston 52 to provide a threaded end 64 for external access to piston 52. An interior chamber 66 is formed by the boss 44, boss 12, cylinder 18 and boss 28.

In operation, the adaptor boss 12 is fastened to the rotating spindle of an engine, lathe, grinding machine, etc. by means of (in this instance) a camlock spindle device. This is a standard method of attachment, and this forms no part of this invention. At the same time as the mandrel is being mounted to the spindle, a draw bar (not shown) provided at the centre of the adaptor boss 12 is attached to piston 52 by means of threaded end 64.

The operation of the device is as follows:

When adaptor boss 12 is fastened to the appropriate spindle attachment of an engine lathe, and a movable drawbar is attached to piston member 54 via threaded end 64, locking ring 22 is removed (if present) and work, in this case an annular die 20 (as shown in FIG. 1 ) is slid over cylinder 18. Lock ring 22 may be replaced and work 20 is moved to the desired position on cylinder 18.

At this time, the piston 52 is moved to the right by the draw bar provided in the lathe attachment and the pressure of the hydraulic fluid in chamber 66 is increased so that the "thin walled" cylinder 18 is expanded to the shape shown in phantom at 68. Piston 52 is maintained in the high pressure position and it will be found that work 20 is securely fastened to the cylinder 18 of the mandrel 10, and the selected shop operations may now be performed on the work 20.

It will be found that the expansion of walls 18 of mandrel 10 provides a simple but effective method of clamping a workpiece on the mandrel. The method of expansion chosen here (i.e. a piston) is convenient, in that the draw bar attached to threaded end 64 will rotate with the spindle to which mandrel 10 is attached so that there is no relative rotating motion between the piston 52 and cylinder 50.

Because the operation of this device relies on increasing and decreasing the static pressure of the hydraulic fluid within the chamber 66, such that no movement of mating parts (such as in a collet type chucking device) is required, there is little wear on the device during use and because the expansion of the walls 18 is well within the elastic limit of the material forming the walls, there is no problems with distortion or fatigue of the clamping parts of the mandrel.

Excellent results have been obtained using a mandrel having the following characteristics:

Outer diameter of the expanding cylinder 3.5 inches (when unexpanded), wall thickness of expanding cylinder 125 thousandths (0.125") of an inch, active length of expanding cylinder 2.5 inches, design hydraulic pressure to expand cylinder approximately 30 psi. The resulting total clamping force for such a cylinder when actuated by a hydraulic fluid pressure of 30 psi amounts to about 700 pounds. The material forming the expanding cylinder was steel. The diameter of the mandrel will be expanded by about $1.5 \times 10^{-3}$ times the diameter of the unexpanded mandrel.

Suitable materials from which to fabricate this mandrel are:

steels such as: 4340, 8620, 52100.

Some grades of beryllium copper will function to provide an expandable mandrel.

In practise, the invention may best be practised if a tolerance of about 1.0 thousandth's of one inch is left between the mandrel and the bore in the workpiece to allow the workpiece to be slid over the mandrel. This will allow the mandrel diameter to only expand 1.0 thousandth's of an inch when the clamping pressure (30 psi) is applied.

For the example previously given for such a mandrel having 125 one thousandth's of an inch wall thickness, the total increase in the diameter of the mandrel if unrestrained would be about 5 one thousandth's of an inch when a pressure of 30 psi is applied to the interior mandrel.

It will be obvious that alterations to this invention are possible by those well acquainted with this art; for instance, boss 44 may be attached to boss 12 in any number of ways, i.e. threading, welding, and the pressure of the hydraulic fluid may also be altered by a variety of means. Applicant wishes to limit the protection of his invention to the scope of the following claims.

I claim:

1. A mandrel for mounting and clamping a suitable work piece thereon, said mandrel comprising a housing having a hollow cylinder contained therein; the cylindraceous walls of said cylinder being composed of an elastic material, said cylinder having a predetermined length and diameter and enclosing an interior cavity of a cylindraceous shape, said cavity being filled with a fluid, piston means to pressurize the fluid in said cavity sealedly mounted coaxially within said cavity and extending the length of said cavity and having one end protruding outside said cavity and being accessible from outside of said cavity so as to enable said piston means to be axially movable by external piston motion inducing means to compress said fluid to expand the diameter of said hollow cylinder at the point of mounting a suitable workpiece thereon to cause the workpiece to be clamped on said mandrel.

2. A mandrel as claimed in claim 1 having suitable mounting means for attachment to an engine lathe.

3. A mandrel as claimed in claim 1 wherein said housing contains a pair of boss members mounted in each end of said housing for mounting said piston means therein, each boss having a coaxial bore therein, the bore in said one end being substantially larger than the bore in the other end, so that both bore surfaces form a pair of coaxial piston chambers to mate with said piston means, said piston means being movable into and out of said chamber for increasing or decreasing the pressure on the fluid in said cavity.

4. An expanding mandrel suitable for mounting a workpiece thereon comprising a housing having a continuous cylindraceous work surface formed by a single cylindraceous wall having closed ends so as to form a hollow cavity filled with a suitable fluid in the interior thereof, a first end being suitable for mounting on an engine lathe, said first end having a hollow first boss which is integrally attached to said first end wall at the center thereof, said first boss having a first axial bore therein for receiving one end of piston means a second end wall having an integral second boss extending inwardly into said cavity from the center thereof, said second boss having a blind bore therein in axial alignment with said first axial bore, said second bore having a communication channel with said cavity, piston means sealedly received in said first and second bores and being actuable from said first end to move axially within said cavity to pressurize and depressurize said fluid in said cavity said cylindraceous wall being formed from an elastic material, and being of such thickness as to permit a predetermined elastic expansion of the cylindraceous surface when said piston is moved into said cavity to compress said fluid.

5. An expanding mandrel as claimed in claim 4 wherein the mandrel is composed of steel.

6. An expanding mandrel as claimed in claim 6 wherein the expansion of said cylindraceous surface equals about $1.5 \times 10^{-3}$ of the external diameter of said cylindraceous surface.

* * * * *